2,988,427
METHOD FOR THE PURIFICATION OF HYDRIDES OF SILICON AND GERMANIUM GROUP OF THE PERIODIC SYSTEM

Herbert Jenkner, Hannover-Wulfel, and Hans Werner Schmidt, Hannover-Kirchrode, Germany, assignors to Kali-Chemie Aktiengesellschaft, Hannover, Germany
No Drawing. Filed July 14, 1958, Ser. No. 748,144
Claims priority, application Germany July 17, 1957
8 Claims. (Cl. 23—204)

The invention relates to improvements in the preparation of pure elements of the fourth group of the periodical system from their hydrides.

Said hydrides, particularly the hydrides of silicon and germanium, may be obtained by various procedures, for instance by reaction of the halides with lithium alumium hydride. The silicon hydrides may be also obtained by hydrolysis of magnesium silicide or other methods.

All these methods have the drawback that the obtained hydrides are contaminated by certain impurities, particularly boron hydrides, which are decomposed together with the hydrides of the fourth group elements. The obtained elements are, therefore, not completely pure and suitable as semi-conductors unless the starting materials or hydrides had been subjected to expensive and complicated purification processes.

It is a principal object of the invention to provide a method of removing contaminating hydrides from the hydrides of the fourth group elements prior to the thermal decomposition of said hydrides.

It is another object of the invention to provide a method for the preparation of purest silicon and germanium from hydrides which are free of boron compounds.

Other objects and advantages will be apparent from the specification and claims.

According to the invention, conventionally produced hydrides of the formula $MeH_4$ and $Me_xH_{(2x+2)}$, wherein Me is an element of the fourth group of the periodic system, such as $SiH_4$, $GeH_4$, $Si_2H_6$, are first passed through a suspension of an alkali metal hydride, which contains an activating organic compound of an element of the third group of the periodic system, and then subjected to thermal decomposition. The hydrides leaving said suspension are free of contaminations and produce, on decomposition, pure metals.

Suitable organic compounds of the third group of the periodic system are the lower trialkyls, such as trimethyl, tripropyl, tributyl, tri-isobutyl and particularly the triethyl compounds of boron and aluminum; we may also employ the corresponding alkyl hydrides, alkyl alkoxides, and alkoxides, suitable alkoxy groups being methoxy or ethoxy.

Said compounds activate the alkali metal hydride for reaction with the impurities of the hydrides, which impurities are converted to solid or liquid complex or addition compounds and retained in the suspension. Such impurities are not only boron hydrides but also halides and other compounds.

The amounts of alkali metal hydride and activating compound are not critical. They will depend on the amount of impurities present in the hydride and on the desired rate of purification. Generally, the alkali metal hydride will be employed in ample excess over the amount required to remove the impurities. As to the activating compound, fractions of a mole up to 30 mole percent and more, calculated on the alkali metal hydride, may be used; generally, good results are obtained with about 5 to 20 mole percent of the activator.

The purification is carried out at temperatures of about 50 to 150° C., preferably at 80 to 120° C. Higher temperatures may be used but generally present no advantage.

The organic compounds recited above need not be added as such but may be formed inside the suspension by a suitable reaction; for instance, triethyl aluminum may be prepared from sodium ethyl and aluminum chloride.

As alkali metal hydride, sodium hydride will be preferred for economic reasons. For a fast reaction, it will be used in finely divided form, and the rate of reaction may be improved by stirring.

Suitable suspending agents for the alkali metal hydride are organic liquids which do not react either with the starting materials or with the end products and which preferably are solvents for the activator. Suitable compounds are, for instance, aliphatic and aromatic hydrocarbons, particularly such hydrocarbons of high boiling point such as mineral or paraffin oils.

In a preferred embodiment of the invention, the purification is carried out in several reactors connected in series, whereby the alkali metal hydride in the last reactors need not contain the activator. When volatile activators are used, said arrangement has the advantage that activator entrained by the gases from one reactor is retained by the alkali metal hydride suspension of the following reactors. Any number of reactors may be used. The reactors of a series may be charged alternately with said activating boron and aluminum compounds, or with mixtures thereof. The last units must be charged and operated under such conditions that the purified hydride cannot carry any volatile components of the activating composition.

Our method accomplishes a complete removal of contaminating compounds from gaseous germanium and silicon hydrides. The recited activating compounds catalyze the reaction of the suspended alkali metal hydride with boron hydrides to solid alkali metal boron hydrides, which are retained in the suspension and thus separated from the germanium and silicon hydrides.

The following examples are given to illustrate the method of the invention.

Example 1

$SiH_4$ containing 0.5 mol percent of $B_2H_6$ was passed at a temperature of 100–120° C. through a 20% by weight suspension of NaH in a mineral oil ($b_1=200°$ C.) containing 15 mol percent of $Al(C_2H_5)_3$, calculated on the NaH. The $SiH_4$ leaving the reactor was passed through a second reactor containing the same suspension as the first reactor, and subsequently through two more reactors being charged like the first two reactors but without $Al(C_2H_5)_3$. Then the gas was thermally decomposed at 800 to 1000° C.; no boron could be found in the thus obtained purest silicon.

Example 2

$GeH_4$ having a $B_2H_6$ content of .5 percent per mole was purified in the same manner as described in Example 1. On thermal decomposition at 600 to 800° C., highest purity germanium was obtained in which boron could not be detected.

Instead of the mineral oil used in Example 1 for the suspension of the NaH, a pure paraffin oil ($b_1=200$–$220°$ C.) was used.

Example 3

The procedure was as set forth in Example 1 but instead of the 15 mole percent of triethyl aluminum, 15 mole percent of triethyl boron were used in the first reactor. The three following reactors contained only the NaH suspension without activator. Also in this case, highest purity boron-free silicon was obtained in the subsequent thermal decomposition.

We claim:
1. A method for the purification of hydrides of silicon and germanium comprising treating a gaseous hydride of said metals, which hydride is contaminated by diborane, with a suspension of an alkali metal hydride containing an activator selected from the group consisting of lower boron and aluminium alkyls, lower boron and aluminum alkyl hydrides, lower boron alkyl alkoxides, and lower aluminum alkoxides, and separating the purified hydride from said suspension.

2. The method claimed in claim 1 wherein said activator is used in an amount of about 5 to 20 mole percent, calculated on the alkali metal hydride.

3. The method claimed in claim 1 wherein the alkali metal hydride is suspended in a hydrocarbon which is inert with respect to the reactants.

4. The method claimed in claim 3 wherein the suspending medium is a member of the group consisting of high boiling mineral and paraffin oils.

5. The method claimed in claim 1 wherein the purification is carried out at a temperature of about 50 to 150° C.

6. The method claimed in claim 1 wherein the purification is carried out at a temperature of about 80 to 120° C.

7. A method for the preparation of highest purity hydrides of silicon and germanium comprising treating a gaseous hydride of said metals, which hydride is contaminated by a small amount of diborane, at a temperature of about 50 to 150° C. with a suspension of sodium hydride in a mineral oil containing triethyl aluminum in an amount of about 5 to 20 percent by weight of said sodium hydride, thereby removing said diborane, and subsequently separating the thus purified gaseous hydride from said suspension.

8. A method for the preparation of highest purity hydrides of silicon and germanium comprising treating a gaseous hydride of said metals, which hydride is contaminated by a small amount of diborane, at a temperature of about 50 to 150° C. with a suspension of sodium hydride in a mineral oil containing triethyl boron in an amount of about 5 to 20 percent by weight of said sodium hydride, thereby removing said diborane, and subsequently separating the thus purified hydride from said suspension.

References Cited in the file of this patent

UNITED STATES PATENTS

| | | |
|---|---|---|
| 2,461,661 | Schlesinger et al. | Feb. 15, 1949 |
| 2,533,696 | Schaeffer et al. | Dec. 12, 1950 |

FOREIGN PATENTS

| | | |
|---|---|---|
| 745,698 | Great Britain | Feb. 29, 1956 |